United States Patent [19]

Nash

[11] Patent Number: 5,188,186

[45] Date of Patent: Feb. 23, 1993

[54] BARRICADE FOR ISOLATING OPEN AREAS FROM SPREADING FIRE OR SMOKE

[76] Inventor: Dale K. Nash, 970 W. 3925 North, Pleasant View, Utah 84414

[21] Appl. No.: 614,257

[22] Filed: Nov. 16, 1990

[51] Int. Cl.$^5$ ............ A62C 2/10; A62C 2/24; A62C 2/18
[52] U.S. Cl. ............ 169/48; 169/54; 169/56; 169/64; 160/40
[58] Field of Search ............ 169/48, 54, 56, 64; 98/50; 299/12; 160/40

[56] References Cited

U.S. PATENT DOCUMENTS

| | | |
|---|---|---|
| 3,645,337 | 2/1972 | Livingston . |
| 3,764,641 | 10/1973 | Ash . |
| 3,766,958 | 10/1973 | Mitchell ............ 169/48 X |
| 3,831,318 | 8/1974 | Richmond . |
| 3,877,525 | 4/1975 | Husson et al. ............ 169/48 |
| 3,960,216 | 6/1976 | Isobe ............ 169/48 |
| 3,990,464 | 11/1976 | Jenkins . |
| 4,023,372 | 5/1977 | Preslar et al. . |
| 4,036,024 | 7/1977 | Dreker et al. . |
| 4,077,474 | 3/1978 | Hattori . |
| 4,102,138 | 7/1978 | Dreker et al. . |
| 4,565,222 | 1/1986 | Lundman . |
| 4,791,994 | 12/1988 | Ho ............ 169/48 |

FOREIGN PATENT DOCUMENTS

| | | | |
|---|---|---|---|
| 2650274 | 5/1978 | Fed. Rep. of Germany ........ 169/48 |
| 2524327 | 10/1983 | France ............ 169/64 |
| 605984 | 5/1978 | U.S.S.R. ............ 98/50 |
| 682656 | 8/1979 | U.S.S.R. ............ 98/50 |
| 708061 | 1/1980 | U.S.S.R. ............ 169/64 |
| 2108839 | 5/1983 | United Kingdom ............ 169/48 |

Primary Examiner—Charles A. Marmor
Assistant Examiner—James M. Kannofsky
Attorney, Agent, or Firm—Trask, Britt & Rossa

[57] ABSTRACT

An expandable barrier for isolating a mine entry or similar open area is disclosed wherein the expandable barrier includes an expandable hollow curtain or bag housed within a horizontal brace member connected to the roof of an entry, the expandable hollow curtain being connected to vertical brace members adjacent to the walls of the mine entry. The expandable bag fills with a material capable of expanding the bag, such as a foam-like material, and expansion of the bag causes the bag to descend downwardly from the first horizontal brace member. The bag fills with distensible material in response to a stimulus detected by a monitor associated with the containers which contain the distensible material. A closeable opening or flap is disposed in the bag to allow passage of people or equipment therethrough. The expandable barrier may also be oriented in a horizontal position for use in vertical shafts.

16 Claims, 8 Drawing Sheets

BARRICADE FOR ISOLATING OPEN AREAS FROM SPREADING FIRE OR SMOKE

BACKGROUND OF THE INVENTION

1. Field of Invention

This invention relates to the obstruction or barricading of confined open areas, such as underground mine entries, tunnels, subways and the like, to isolate fire or smoke generated in one location from spreading to other areas. More particularly, this invention relates to expandable barricades for obstructing an entry opening.

2. State of the Art

Every year hundreds of lives are lost or endangered in mine disasters because of fires or explosions which cannot be contained to a specific area. Additionally, fires in mines, if not contained to one area, can damage interconnected mine entries and make access to the mine difficult or impossible. Also, the spread of uncontrolled fires in coal mines, for example, consumes large quantities of valuable coal, and destroys large amounts of valuable equipment and infrastructure.

A number of barriers have been designed to block off mine entries or other types of passageways after an explosion or fire has occurred. For example, U.S. Pat. No. 4,077,474 to Hattori discloses a curtain of fire-resistant fabric releasable from a frame above an entry. U.S. Pat. No. 3,831,318 to Richmond discloses a series of inflatable bags which, when inflated with air, converge together to block the opening or passageway. Similarly, U.S. Pat. Nos. 4,102,138 and 4,036,024 to Dreker disclose an inflatable bag, initially filled with air, which is later filled with a material of a type which permanently blocks the mine passageway. U.S. Pat. No. 3,645,337 to Livingston discloses an overhead chamber through which a gel is excreted to form a curtain of synthetic material which dries into a solid blockade. And U.S. Pat. No. 4,023,372 to Preslar discloses a partially inflatable wall of fabric which allows passage therethrough.

SUMMARY OF THE INVENTION

The present invention encompasses an expansible barricade for blocking passageways, especially underground passageways. The invention includes a horizontal brace member positioned along the roof of a mine or similar passageway, and two vertical brace members which are attached to the walls of the mine passageway and which are connected to either end of the horizontal brace to form an opening therethrough. The vertical brace members and the horizontal brace member form a frame of the invention. The vertical and horizontal brace members may be anchored to the mine walls and roof, respectively, by, for example, bolt means. Alternatively, the vertical brace members may be bolted to the walls of the mine while the horizontal brace is supported by the vertical brace members. In a preferred embodiment, the vertical brace members are expandable in a longitudinal direction, and may be braced with sufficient force against the roof and floor to support the horizontal member without the aid of any attachment means to the walls and roof of the mine.

An expansible means in the form of a double-walled curtain is maintained proximate the frame formed by the horizontal and vertical brace members. The double-walled curtain is maintained proximate the frame prior to operation of the barrier system. The curtain generally comprises a front panel and a back panel joined together and sealed about the edges to form a hollow screen of material. That is, the double-walled curtain is generally hollow, such as a bag, and is capable of expanding when filled with a suitable fluid or solid material. The double-walled curtain generally forms a barrier having a width equal to the opening between the two vertical brace members and a length equal to the distance between the horizontal brace member and the floor of the mine entry. The depth of the curtain, as measured between the two panels, may be from about two to about eight inches.

In a preferred embodiment, the double-walled curtain (also referred to herein as a bag) generally has an upper edge connected to the horizontal brace member, sides which are attachable to the vertical brace members, and a lower edge which contacts the floor when the curtain is completely lowered to the floor. The curtain may also have a plurality of internal or external structural members or baffles which help to stabilize the form of the curtain while filling or expanding. When the curtain is activated it moves downwardly and when totally expanded, it forms a barrier which completely obstructs the opening formed between the brace members and the floor. The curtain, prior to filling with expansible material, is maintained adjacent to the first horizontal brace member in a compact and folded manner. The curtain remains stored adjacent to the first horizontal brace member until signalled to begin filling and/or descending from the roof of the mine entry.

In an alternative embodiment, the double-walled curtain may be maintained proximate at least one of the vertical brace members prior to being expanded. The bag of this embodiment has a front panel and a back panel joined together to form sides about the periphery. An upper side of the curtain is attached to the horizontal brace member, and a lower side of the curtain extends along the floor of the mine entry when the curtain is deployed. When activated, the double-walled curtain of this embodiment moves transversely across the passageway to form a barricade which completely blocks the passageway.

Material for filling the double-walled curtain is maintained in containment means which are in communication with the hollow interior of the curtain. In response to proper stimuli, such as an increase in toxic gases or an explosion, the barrier begins to fill with the expansible material. The expansible material may be any suitable fluid or solid material, including liquid materials and gelatinous or foam-like materials. In a preferred embodiment, the material used for expanding the curtain is a foam material which exists as non-reacted precursor chemicals maintained in separate containers. In response to a proper stimulus, the precursor chemicals admix together to form a material which expands greatly to fill the curtain.

In a preferred embodiment, the curtain is released from within the housing or frame formed by the horizontal and vertical members in reaction to a stimulus. For example, a small explosive charge or compressed gas discharge generated by means associated with the invention may cause the curtain to be released from the frame. Alternatively, mechanical means may cause latching means holding the curtain in place during storage to disengage thereby allowing the curtain to be deployed. Alternatively, the curtain may be released manually.

The action of the double-walled curtain being filled with material typically facilitates deployment of the curtain. That is, as the curtain begins to fill with fluid or solid material, it is forced to descend downwardly from adjacent the first horizontal brace member or, in an alternative embodiment, the curtain is forced outwardly, i.e. transversely, from the vertical brace members. The curtain may be fitted with a weight along the lower edge to facilitate the descent of the curtain from its position proximate the roof of the mine. In an alternative embodiment, the curtain is housed within and is attached to an elongated box which is releasably attached to the horizontal brace. In response to a proper stimulus, the elongated box is released to act as a weight. The box drops to the floor of the mine extending the curtain with it. The curtain then begins to fill with expansible material.

When the curtain is housed within the horizontal member which is preferably in a sealed relation to the mine roof, each side of the double-walled curtain is preferably loosely attached in some manner to an adjacent vertical brace member. For example, each side of the curtain may be fitted with a plurality of rings or loops which are slidably disposed about a post integrally formed in each vertical brace member such that as the curtain descends, the rings slide downwardly about the post of the vertical brace member. In this manner, the curtain is guided during its descent so that its edges stay proximate the mine walls and the full cavity of the bag is readily available to be filled with foam or other expanding material.

Alternatively, a plurality of flanged pin members may be attached to the sides of the curtain, the flanged portion of each pin member being slidably disposed within a track formed in the length of each vertical brace member. The sides of the curtain may also have small holes or grommets through which the foam or other expansible material may exude to form a tight seal between the curtain, the vertical brace members, and the vertical walls of the mine entry.

When the curtain in housed within at least one of the vertical members, the upper side of the curtain is preferably attached in some manner to the horizontal brace member. For example, the upper side of the curtain may be fitted with rings or loops which are slidably disposed on a bar integrally formed with the horizontal brace member. The bottom side of the curtain may or may not be attachable in some manner to the floor of the mine shaft. In this embodiment, the upper side of the curtain may have small holes or grommets formed therein through which the foam or other expansible material may exude to form a tight seal between the upper edge of the curtain and the horizontal brace member and roof.

The curtain may have a closeable opening or flap formed therein which is structured to allow persons or equipment to pass from one side of the barrier to the other. For example, a person trapped in an isolated portion of a mine entry could open the closed flap in the curtain to exit the isolated area, and would then close the flap again to keep smoke and flames from escaping into the rest of the entry.

A monitoring and triggering system is associated with the curtain and the containers of expansible material. The triggering system may be of any type which detects unsafe conditions or unsafe levels of heat, smoke, gases, or the like. For example, when the level of carbon monoxide in the mine entry increases over a certain level as detected by sensing means, the stimulus triggers release of the curtain and causes the material for expanding the curtain to begin to form and fill the curtain. There may also be a manual triggering system which can be actuated by a person to initiate release and expansion of the curtain in case of emergency or system failure. In addition, a remote monitoring system may be associated with the invention which is in communication with the triggering system of the invention. The remote monitoring system may allow an observer to monitor gas and heat levels in various areas where the barricades of the invention are installed, and may allow the observer to trigger the barricade of the invention from a remote position in response to observed elevated levels of gas, heat, or the like. Further, the remote monitoring means may allow an observer to evaluate which barricades in a network system, such as a mine, may have been triggered.

DETAILED DESCRIPTION OF THE PREFERRED EMBODIMENTS

The barricade of the invention is installed in any confined, open area which may be susceptible to fire, explosion, or permeation of toxic smoke or gas therethrough. Thus, the invention may be used in any setting where a passageway exists, especially personnel passageways such as in buildings, subways, or airplanes. In a preferred use, the invention is installed in a mine entry, i.e. tunnel or shaft, or the like to isolate one area of the mine from another.

Figure 1:
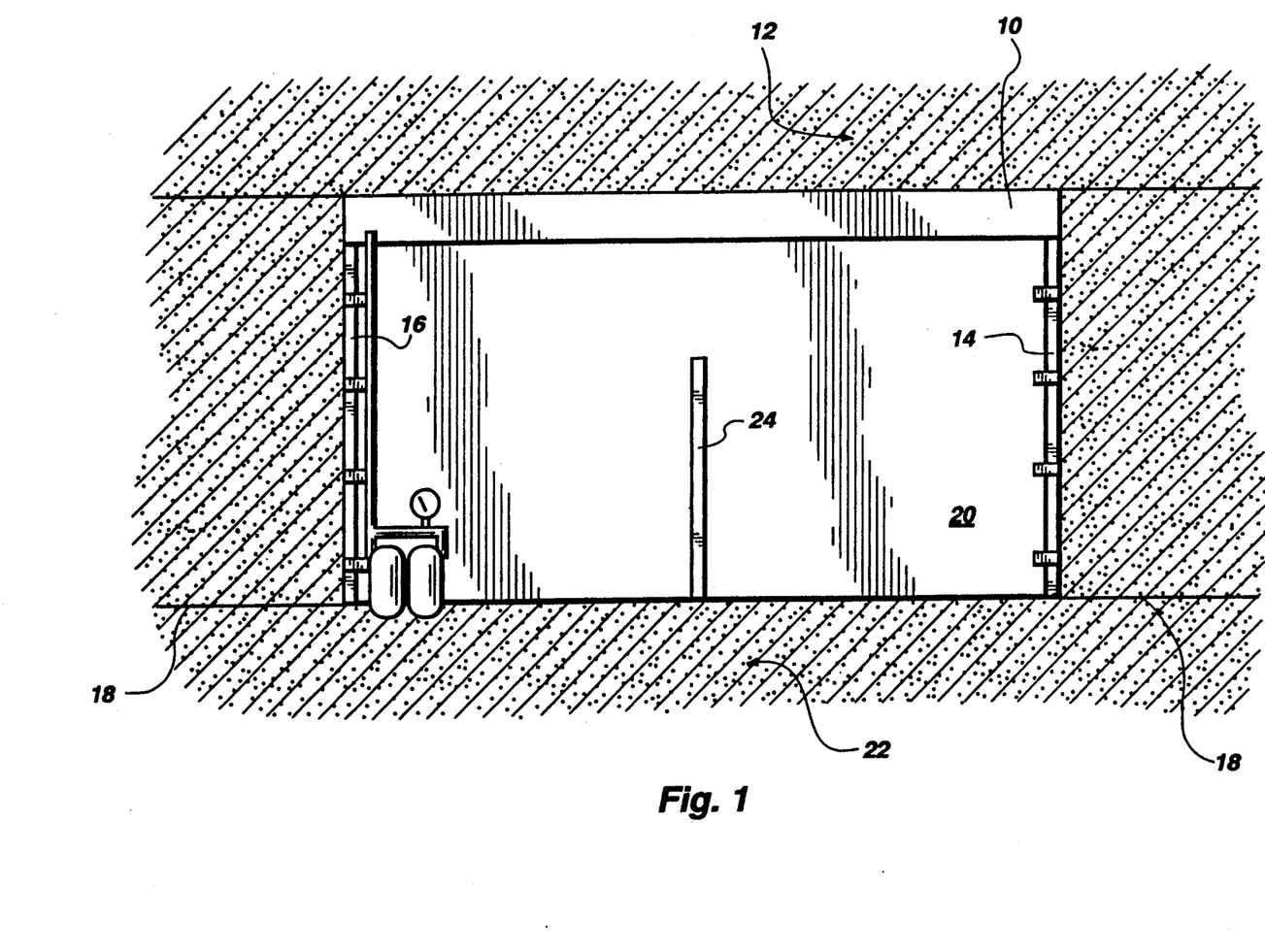
FIG. 1 is a front view of the invention as installed in a mine entry.

FIG. 1 generally illustrates the invention which includes a longitudinal substantially horizontal brace 10 positioned proximate the upper face (roof) of a mine entry in the overlying roof rock 12, and vertical braces 14, 16 positioned proximate the walls 18 of the mine passageway. The longitudinal brace 10 and the vertical braces 14 and 16 form a frame defining a frame which proximates the shape of the opening in the mine entry. An expandable curtain or bag 20 extends from vertical brace 14 to vertical brace 16, and from the longitudinal brace 10 to the floor 22 of the mine entry. The expandable bag 20 serves as a closure which occludes the opening formed by the brace members. The bag 20, as shown in FIG. 1, may include a closeable opening 24 formed in the bag which allows movement of persons or equipment therethrough.

Figure 2:
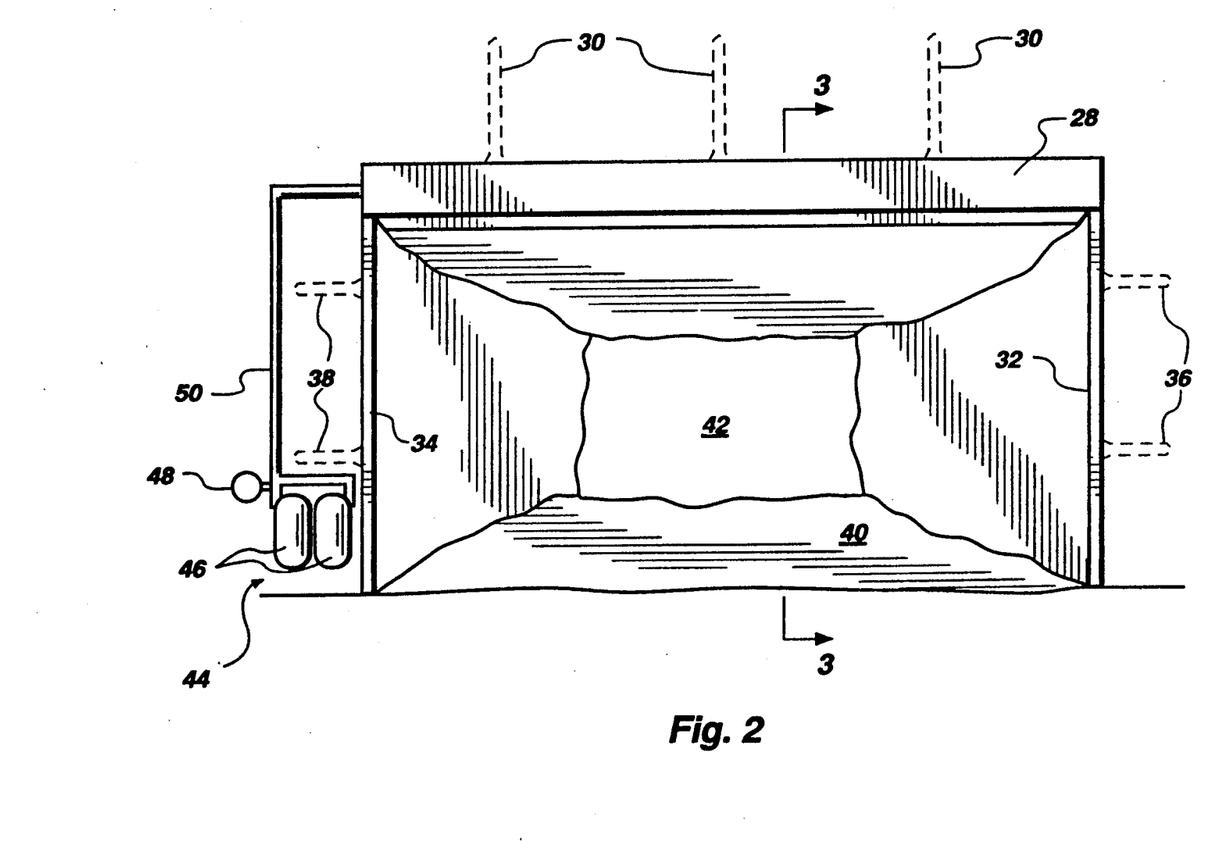
FIG. 2 is a front view of the invention illustrating the structural components.
Figure 11:
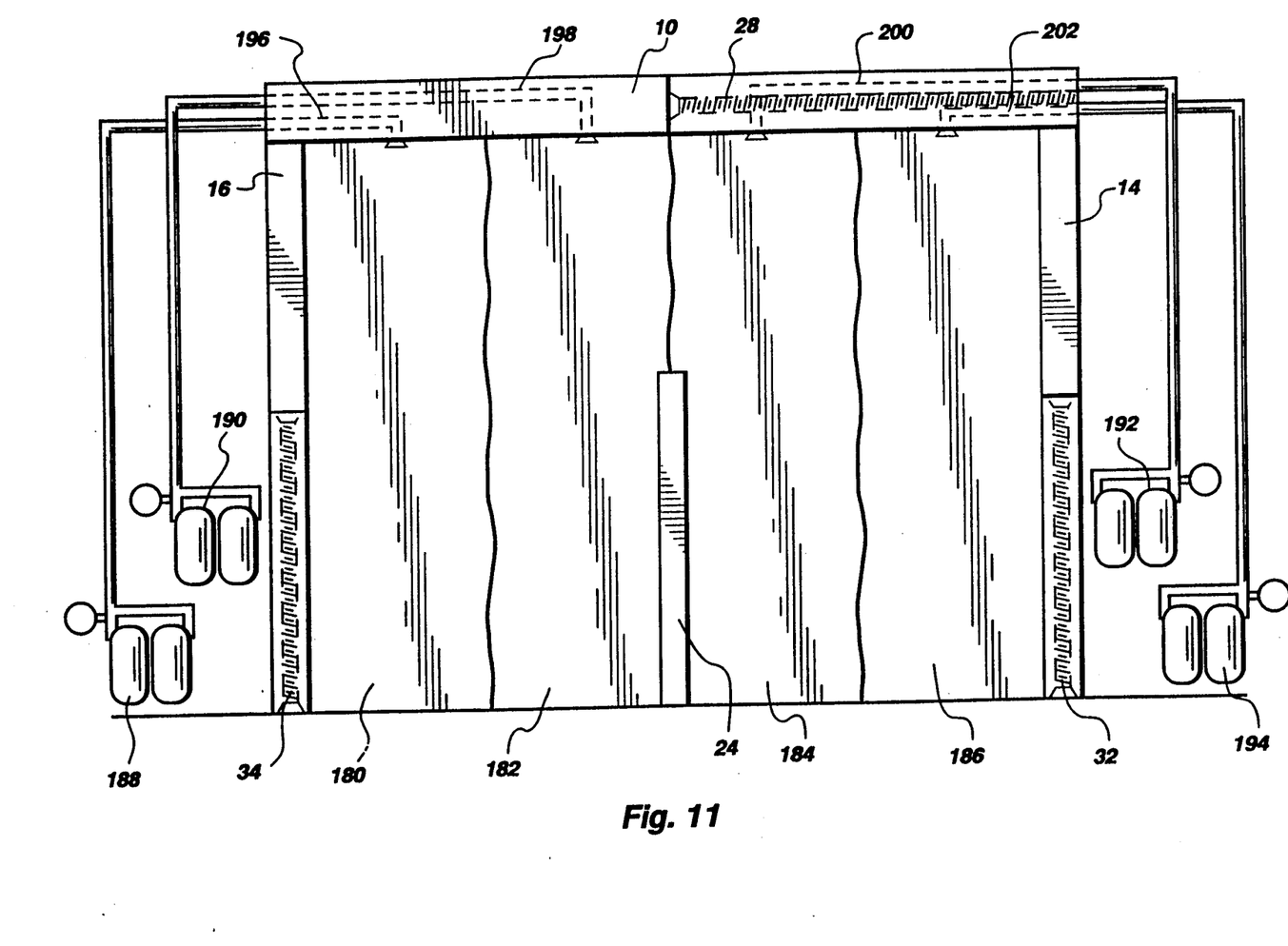
FIG. 11 is a front elevational view of an alternative embodiment of the invention, shown in partial phantom.

As more fully illustrated in FIG. 2, the longitudinal brace 28 is connected to the roof of the mine entry by bolts 30 which are driven into the rock formation. The longitudinal brace 28 need not be bolted to the rock formation, and instead may be supported in place by the vertical brace members 32 and 34. Alternatively, the longitudinal brace 28 may be expandable in a longitudinal direction and, therefore, may be biased against the sides of the mine entry (as shown in FIG. 11). As such, the expandable longitudinal brace may initially be collapsed for easy storage and convenient transportation to the site of installation of the barricade in the mine. Regardless of the means of attachment or support, the longitudinal brace should be installed in relation to the mine roof in a substantially horizontal plane so that the bag housed within the longitudinal brace may descend easily without binding.

In a preferred embodiment, the longitudinal brace 28 forms a housing generally comprising three closed sides and an open bottom side through which the expandable bag descends. The bottom opening in the bag housing 28 may be covered with a door which keeps out dust and dirt. The door may be hinged with latches along one edge or latched along both edges and attached to the bottom of the bag to assist its descent. The longitudinal brace or housing 28 interconnects with a vertical brace 32 at one end, and interconnects with a vertical brace 34 at the other end. The longitudinal brace 52 and the vertical braces may be manufactured from any suitably stable and fire-resistant material such as metal or hardened plastic; sturdy aluminum material is contemplated in a preferred embodiment.

The vertical brace members 32 and 34 may be bolted to the walls of the mine entry by bolt means 36 and 38, as illustrated in FIG. 1. In a preferred embodiment, the vertical brace members 32 and 34 are expandable in a longitudinal direction and are forcedly biased between the housing 28 and the floor 40 of the mine as illustrated by FIG. 11. Expandable vertical members, though biased against the roof and floor of the mine, may also be secured to the walls of the mine entry in some manner, such as by bolts. An opening 42 is defined by the positions of the housing 28 and the first and second vertical braces 32 and 34.

The longitudinal, horizontal brace and vertical braces may not be tight fitting to the roof and walls because of the irregularity of the roof and wall surfaces. Sealing material, such as foam, may be injected between such members on the walls and roof to provide a complete barrier when the bag member is disposed to fill the opening encompassed by these members. The horizontal and vertical brace members may be expandable, and thus, adaptable to varying dimensions of mine entries or other passageways. The expandable bag, however, has predetermined lateral dimensions.

The expandable bag, which is more fully described below, is maintained within the housing 28 when in the preoperative (stored) mode (i.e., when not filled with material). The material for filling the expandable bag, generally at 44, is positioned proximate the housing 28. The material for filling the expandable bag may be any suitable liquid or solid material which is capable of filling and expanding the bag relatively rapidly so as to form a barrier, as described below.

In a preferred embodiment, the material for filling the expandable bag is an expansible, foam-like material produced by the admixing of two or more chemical components which are maintained separately in a non-reacted state within containers 46. In response to a stimulus, as detected by a monitor 48 associated with the containers 46, the non-reacted chemicals are released from their respective containers 46 to mix to form the foam-like material. As the chemical components mix, the foam continuously and rapidly expands. The foam travels through a channel 50 which is interconnected between the containers 46 and the housing 28. The foam enters from the channel 50 into a conduit positioned within the housing, and from there it is exuded into the interior of the bag, as described below. The foam-like material is fire-resistant and has properties sufficient to withstand increased heat and vibration from the blast of an explosion. The foam-like material may also be non-flammable.

Figure 3:
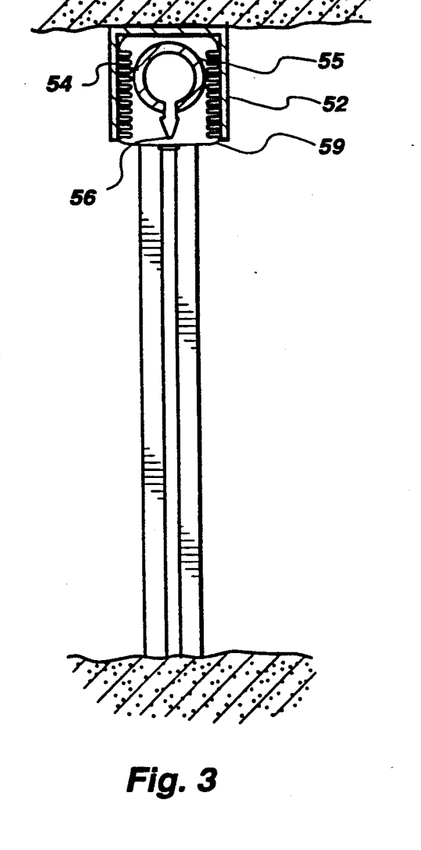
FIG. 3 is a cross-sectional view of the invention illustrated in FIG. 2 taken at line 3—3.
Figure 4:
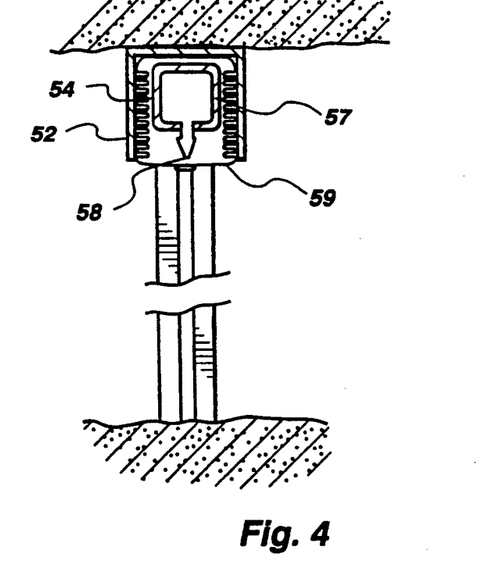
FIG. 4 is a cross-sectional view of the invention in an alternative embodiment.

As more fully illustrated in FIG. 3, the housing 52 is hollow, i.e. it is an elongated box. Positioned within the housing 52 is an elongated conduit 54 which extends the approximate length of the housing 52. In a preferred embodiment, the conduit 54 is a hose 55 having at least one nozzle 56 attached thereto. In an alternative embodiment, as shown in FIG. 4, the conduit 54 is a trough 57 which is substantially a closed conduit having an open channel 58 formed along its length oriented toward the bottom face of the trough 57. The trough 57 is interconnected with the channel which carries foam from the containers, and is adapted to receive the foam flowing from the channel into the trough 57.

Figure 5:
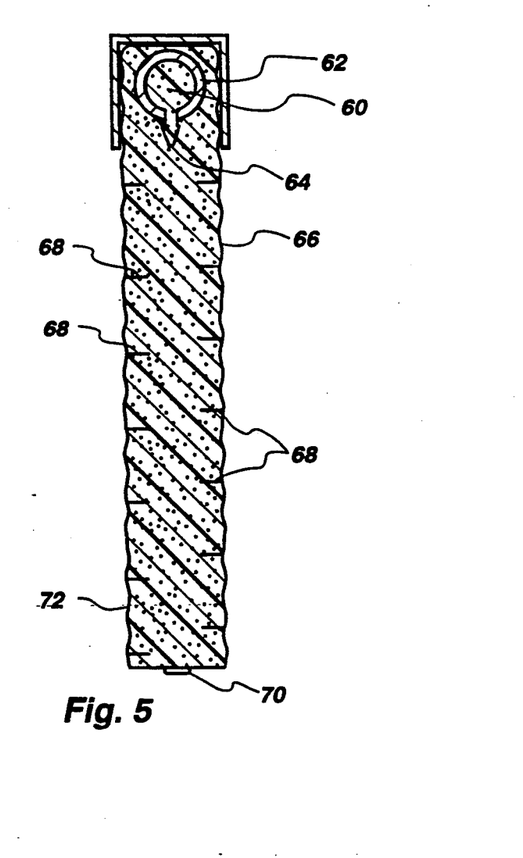
FIG. 5 is a cross-sectional view of the invention illustrating deployment.

The expandable bag 59, as shown in FIGS. 3 and 4, is connected to the housing 52 proximate the point of attachment of the housing 52 to the roof. The conduit 54 is positioned within the expandable bag 59; that is, the expandable bag is disposed around the outside of the conduit 54. The expandable bag may be manufactured from any type of suitable material or fabric which is strong and fire-resistant. When the expandable bag is in the pre-operative mode (i.e., not filled with material), it is maintained within the housing 52 in a folded or pleated conformation. When foam 60, or other distensible inflation material, is released into the conduit 62, as illustrated in FIG. 5, the foam extrudes from the nozzles or open channel 64 formed in the conduit 62 and enters into the folded expandable bag 66. The expandable bag may be manufactured with a plurality of structural ribs or baffles 68 to regulate the flow of foam or other expandable material into the bag and to maintain its structural form. A light weight 70, such as a metal bar or individual weights, may be placed at the bottom edge of the bag 72 to aid in its even descension from the housing.

Figure 6:
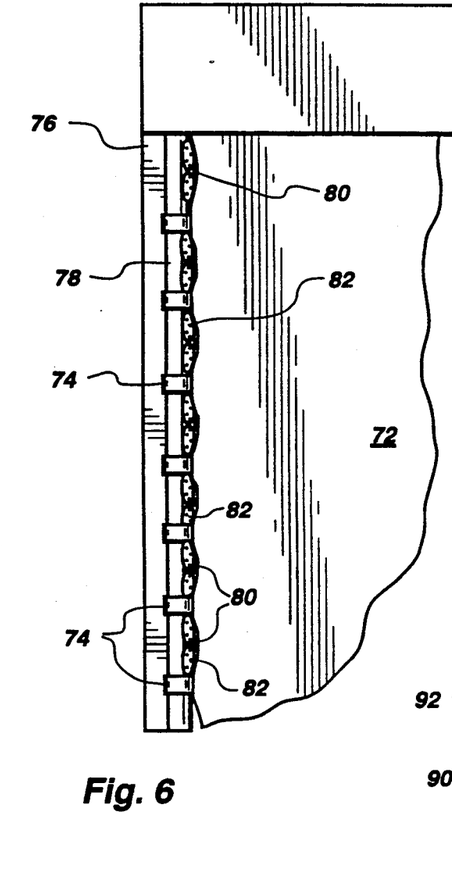
FIG. 6 is an enlargement of the barricade illustrating connection of the double-walled curtain to the vertical brace member.

The sides of the expandable bag are connected to the vertical braces to assist in uniform disposition of the bag between the housing and vertical braces, and to assure a complete blockage of the opening formed therebetween. FIG. 6 illustrates a preferred embodiment of the invention where the expandable bag 72 has a plurality of loops or rings 74 attached to the sides of the bag 72. The vertical brace 76 is designed with a vertical pole 78 extending the length of the vertical brace 76. The rings 74 attached to the expandable bag 72 are slidably disposed about the pole 78 and move downwardly about the pole 78 as the bag descends from proximate the roof of the mine.

Figure 7:
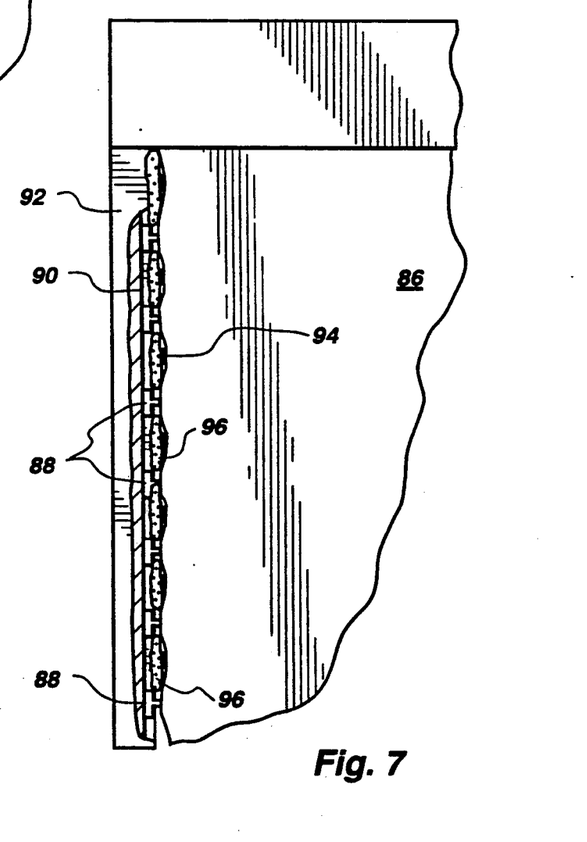
FIG. 7 is an enlargement of an alternative mode of connecting the double-walled curtain to the vertical brace member.

Apertures or grommets 80 may be formed around the perimeter of the bag 72 in proximity to the attachment of the rings 74 to the bag 72. The grommets 80 allow the expanding material 82, e.g. foam, to exude outwardly from the interior of the bag 72 to form a seal between the bag 72, the pole 78, and the walls of the mine entry. In an alternative embodiment, as illustrated in FIG. 7, the sides of the bag 86 may be fitted with a plurality of flanged pin members 88. The flanged portion of the pin members 88 are slidably disposed within a vertically oriented recessed track 90 of the vertical brace 92. Apertures or grommets 94 formed in the sides of the bag in proximity to the placement of the flanged pin members 88 allow the filling material 96 to exude outwardly from the interior of the bag 86 to form a seal between the bag 86, the vertical brace 92, and the walls of the mine entry.

In an alternative embodiment, the vertically oriented recessed track may be conformed within the vertical brace so that the sides of the expandable bag are recessed within the vertical brace. Therefore, as the bag fills with expanding material, the edges of the bag are forced against the vertical brace producing a tight seal therebetween. Although only one side of the expandable bag and vertical brace is shown in FIG. 6 and FIG. 7, it is understood that the description of the attachment of the expandable bag to the vertical brace is equally applicable to both sides of the expandable bag.

Figure 8:
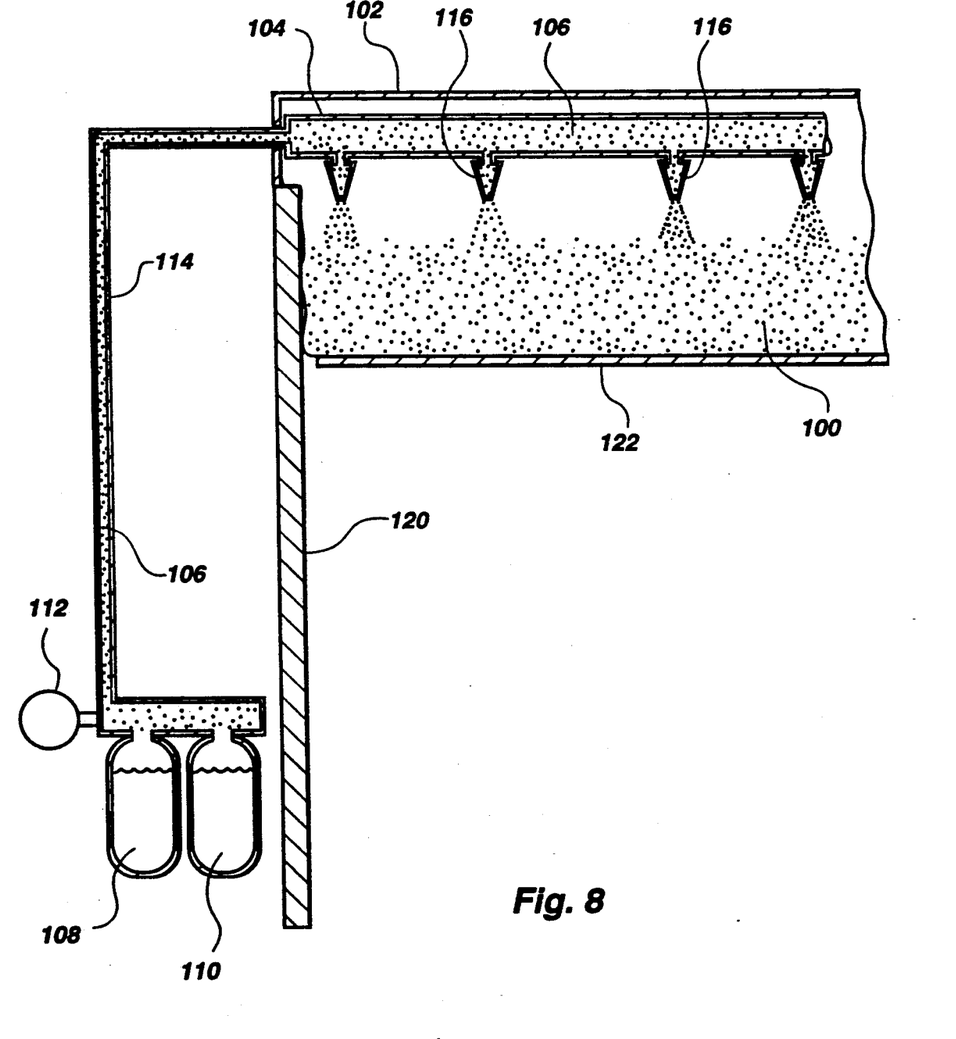
FIG. 8 is a cross-sectional view of the invention illustrating deployment and expansion of the curtain.

In FIG. 8, a cross-section of a preferred embodiment of the invention illustrates the association of the expandable bag with the vertical braces, and illustrates deployment of the bag. The conduit or hose 104 is positioned within the housing 102 and within the bag. The expandable bag 100 is initially maintained within the housing 102 in proximity to the hose 104. The material for filling the expandable bag may be any suitable material which will fill the void within the bag and impart a degree of rigidity and permanence to the structure. As illustrated in FIG. 8, the preferred expandable material is a foam-like material 106 which is produced from two or more non-reacted chemical precursors which are maintained in separate containers 108, 110 located in close proximity to the structure of the invention. Valve means are connected to the containers 108 and 110.

A monitoring and triggering device 112 associated with the valve means of the containers 108, 110 detects environmental stimuli sufficient to trigger activation of the valve means and release of the chemical precursors of the foam material. The monitor may be selected to detect any form of stimulus. For example, the monitor may detect increased levels of heat, increased levels of smoke, increased levels of ionization, or increased levels of certain gases such as carbon monoxide or carbon dioxide. The monitor may also be motion-sensitive such that any significant vibration, such as an explosion, may trigger the release of the precursor chemicals maintained within the containers 108, 110. Means for manually actuating or overriding the release of the precursor chemicals as a result of failure of the system is integrated into the apparatus. The expandable bag is rapidly deployed after detection of a proper stimulus.

A remote monitoring and triggering system may be associated with the invention so that a person at a distance from the invention may monitor certain conditions, such as smoke or heat, and may trigger the release of the expandable bag. A remote monitoring and triggering system may further include a remote system of monitoring a network of barricades to determine which barricades have been triggered in the network and where dangerous conditions exist.

In response to a proper stimulus, the monitor 112 signals activation of the valves and release of the precursor chemicals from the containers 108, 110. The containers may be pressurized to aid in the mixing and dispensing of the expansible foam. The foam-like material formed from the admixture of the chemicals moves through the channel 114 toward the conduit or hose 104. The channel 114 connects to the conduit 104 and communicates the foam substance 106 thereto. The continuously expanding foam 106 enters the conduit 104 and moves along its length. The foam 106 exits the conduit 104 through a plurality of nozzles 116 extending from the conduit 104. The expanding foam fills the bag 100. The distensive action of the foam 106 in the bag, added to the increased weight of the foam filling the bag 100 causes the bag 100 to begin to descend downwardly. The sides of the bag 100 are connected to the vertical braces 120, as described above, and the connection facilitates the even descension of the bag to the floor of the shaft. The uniform descension of the bag 100 may be facilitated further by the placement of a weight 122 at the bottom edge of the bag 100. The expandable bag 100 is substantially filled within seconds to minutes of initial release of the precursor chemicals.

Figure 9:
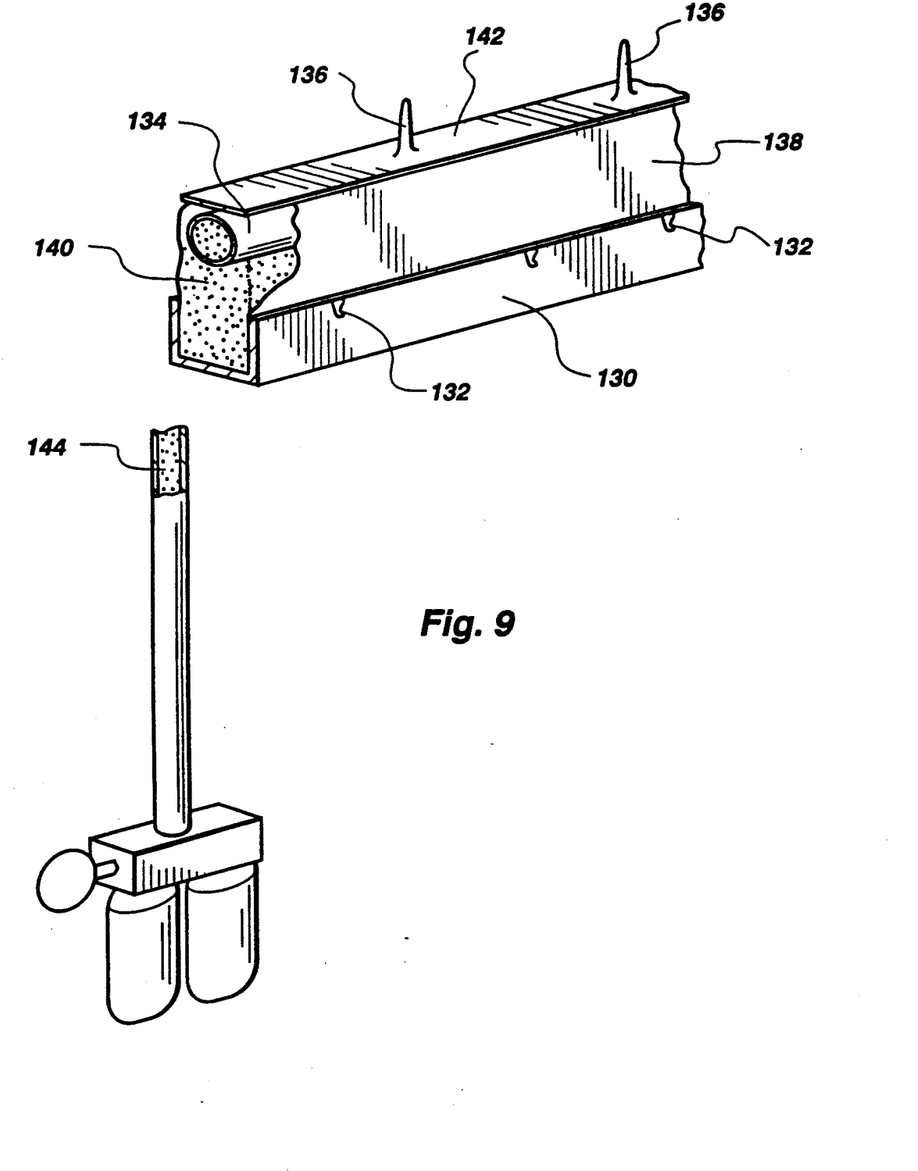
FIG. 9 is a perspective view, in partial cut-away, illustrating an alternative embodiment of the invention.

In an alternative embodiment, as illustrated in FIG. 9, the expandable bag is attached to the mine entry by bracket means 142 which is attached to the roof of the mine entry, and the expandable bag 138 is maintained with the housing 130. The housing 130, having bottom, front and back sides, is releasably connected to the bracket 142 or to the roof of the mine entry by temporary locking means, such as releasable fasteners 132. The conduit 134 is securely attached to the roof of the mine entry, proximate the bracket 142, and is disposed within the expandable bag 138. The bottom edge of the expandable bag 138 is attached to the housing 130. When an appropriate stimulus is detected by the monitor, the releasable fasteners 132 disengage the housing 130 from the roof of the mine entry allowing the housing 130 to drop from the roof to the floor. As the housing 130 drops, the bag is forced to extend downwardly with the housing. The bag then begins to fill with the expansible material 140 carried through channel 144. In this configuration, the housing acts as a weight to facilitate the descension of the bag.

Figure 10:
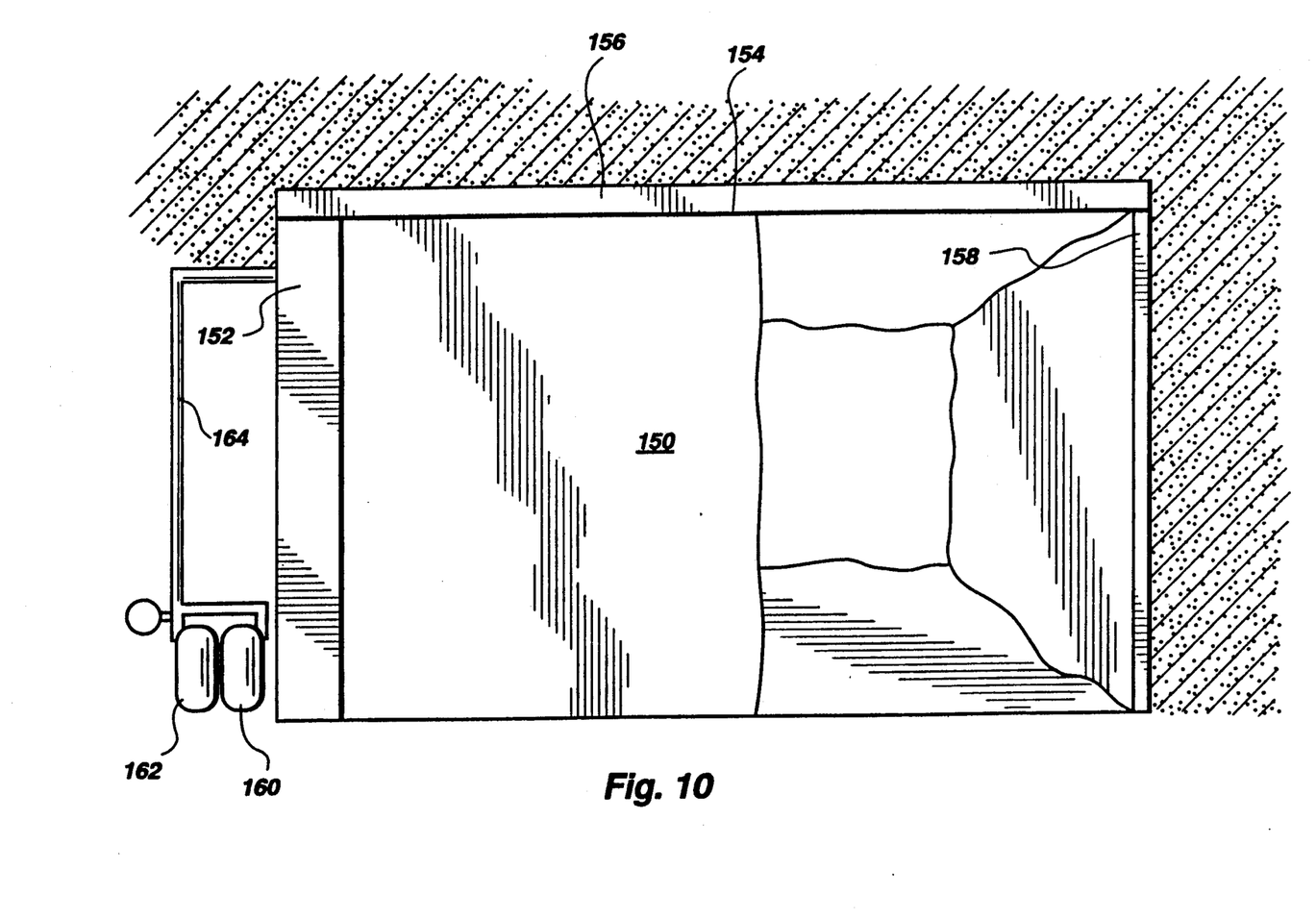
FIG. 10 is a front elevational view of an alternative means of deployment of the invention.

The foregoing disclosure presents a preferred configuration of the invention and a preferred means of deployment. In an alternative embodiment, as illustrated in FIG. 10, the expandable bag 150 may be housed within a vertical brace member 152 prior to deployment. The expandable bag 150 is connected at its top side 154 to the horizontal brace 156. In response to a proper stimulus, the bag 150 is caused to be ejected from the vertical brace 152 and is forced across the opening formed by the longitudinal brace 156 and the vertical brace members 152 and 158. Deployment of the bag 150 is very rapid. The bag 150 then begins to fill with expansible material formed from precursor chemicals maintained in tanks 160 and 162 associated with the vertical brace member 152. The expansible foam material travels through channel 164 and enters into a conduit housed within the vertical brace member 152. The bag is filled with the expansible material exuded from the conduit within seconds to a few minutes.

Alternatively, an expandable bag may be housed in each vertical brace member. In response to a proper stimulus, both bags may be released from their respective housings within the vertical braces. The bags may be deployed in such a manner that both bags meet at a midpoint between the length of the horizontal brace, and when filled, the bags completely block the opening formed between the horizontal and vertical braces. In this embodiment, container means containing flowable material are associated with each vertical brace, and each vertical brace has associated with it a conduit in communication with the expandable bag housed within the vertical brace.

Although a single expandable bag is a preferred embodiment of the invention, the expansible bag may be comprised of more than one expandable bag, as illustrated by FIG. 11, each bag 180, 182, 184 and 186 being interconnected with at least one other bag to form a curtain for complete blockage of the opening between the housing 10 and the two vertical braces 14 and 16. The expandable bags by may be expanded by attachment of multiple sets of containers 188, 190, 192 and 194 containing chemical precursors to individual conduits 196, 198, 200 and 202 which communicate with a respective bag as illustrated. The containers may be placed at either end of the housing 10 so that the distensive or filling material (foam) enters at both ends of the conduit. Multiple sets of containers of chemical precursors may be connected to the conduit when a single expandable bag is used in the invention.

As illustrated in FIG. 1 and FIG. 11, the expandable bag may have a closeable opening or flap 24 formed therein. The opening may be in the form of a seam located in the lower portion of the expandable bag, the edges of the seam being closed by some interlocking means such as Velcro ®. The flap 24 in the expandable bag allows persons to escape from the area isolated by the barricade, or allows equipment to be placed through the opening.

It is contemplated that the expandable bag will be filled with expansible material after deployment. However, the invention is intended to address the specific requirements of various emergency situations. As such, it is contemplated that the expandable bag may, in some situations, be deployed without filling thereafter. Such emergency situations may exist when the invention is installed in a grain elevator to contain explosions, or in subways and airplanes where isolation is necessary, but containment of toxic gas from a fire is less critical.

Although the invention has been generally described to be used in horizontal tunnels and similar confined spaces, it may also be used to seal off vertical shafts, including elevator shafts. With guide posts located horizontally, the expansion of the foam material will force a double-walled curtain across a vertical shaft. Alternatively, an explosive charge, such as that used in air bags for automobiles, may be used to "blow" the bag across a vertical shaft.

In an elevator shaft, the cables may be accommodated by having a split bag or having two bags, one expanded from each side of the shaft, to meet at the position of the cables.

The placement and disposition of the components of the invention described hereinabove are suggestive of embodiments of the invention, but are not intended to limit the scope of the invention as claimed below.

What is claimed is:

1. An apparatus for isolating portions of a confined open area from other portions of such area, said open area being confined by a roof, side walls and a floor comprising:
   a substantially horizontal hollow housing, said hollow housing having a first end and a second end;
   a first, substantially vertical brace member having an upper end connected to said first end of said horizontal hollow housing and a lower end supported by the floor;
   a second substantially vertical brace member having an upper end connected to said second end of said horizontal hollow housing and a lower end supported by said floor, said horizontal hollow housing, first, and second vertical brace members forming a structural frame which circumscribes an opening therebetween;
   an expandable hollow curtain attached and positioned proximate to said horizontal hollow housing, said expandable hollow curtain being structured to block completely said frame opening when said expandable hollow curtain is deployed and in an expanded condition;
   conduit structure including a trough housed within said horizontal hollow housing and a hose having at least one nozzle associated therewith, said conduit being in fluid communication with said expandable hollow curtain;
   container means for containing flowable material for expanding said expandable hollow curtain, said container means being in communication with said expandable hollow curtain; and
   activating means connected to said container means for causing said container means to release said flowable material for expanding said expandable hollow curtain, said activating means being activated by an appropriate stimulus.

2. The apparatus according to claim 1 wherein said activating means is a motion-sensitive monitor in electrical communication with said container means containing said flowable material.

3. The apparatus according to claim 1 wherein said horizontal hollow housing is expandable in a longitudinal direction between said first end and said second end.

4. The apparatus according to claim 3 wherein said first vertical brace member and said second vertical brace member are each extendable in a longitudinal direction.

5. The apparatus according to claim 1 wherein said expandable hollow curtain comprises a plurality of expandable hollow bags, and further comprising a closeable opening between two said bags for movement of objects from one side of said expandable hollow bags to the other side of said expandable hollow bags.

6. The apparatus according to claim 5 wherein said material for expanding said bags is a foam produced from precursor chemicals, and wherein said container means comprises a plurality of containers containing said precursor chemicals.

7. The apparatus according to claim 6 further comprising conduit means associated with each said bag, each said conduit means being attached to a plurality of said containers containing said precursor chemicals to form said material for expanding said bag.

8. The apparatus according to claim 7 wherein each said expandable bag has associated therewith a plurality of structural members connected to each said expandable bag to maintain the shape of said bag during expansion thereof.

9. The apparatus according to claim 1 wherein said expandable hollow curtain is a bag of predetermined dimensions having sufficient width and length to completely obstruct said frame opening when said bag is filled with said flowable material, said bag having a front panel, a back panel, a first side, a second side, an upper edge and a lower edge.

10. The apparatus according to claim 9 wherein said first side of said bag is connected to said first vertical brace member and said second side of said bag is connected to said second vertical brace member.

11. The apparatus according to claim 10 wherein said first vertical brace member and said second vertical brace member each include a vertical pole member, and wherein said first side and said second side of said expandable bag are each fitted with a plurality of loops, said loops of said first side being slidably disposable about said vertical pole member of said first vertical brace member and said loops of said second side being slidably disposable about said vertical pole of said second vertical brace member.

12. The apparatus according to claim 10 wherein said bag further comprises a weight positioned along said lower edge of said expandable bag to urge said bag downwardly.

13. The apparatus according to claim 10 wherein said first side and said second side of said expandable bag have a plurality of apertures formed therein through which said flowable material can flow from within said bag to outside said bag to form an airtight seal between said bag and said first vertical brace member and between said bag and said second vertical brace member.

14. The apparatus according to claim 10 wherein said bag further comprises structural members located within said bag to maintain the shape of said bag during the expansion thereof.

15. The apparatus according to claim 10 wherein said first vertical brace member and said second vertical brace member each have a channel formed therein which extends the length of said vertical brace member, and wherein said first side and said second side of said expandable bag have associated therewith a plurality of flanged pin members spaced along the length of said first side and along the length of said second side, each said flanged pin member of said first side being slidably disposed within said channel formed in said first vertical brace member and each flanged pin member of said second side being slidably disposed within said channel formed in said second vertical brace member.

16. The apparatus according to claim 15 wherein said first side and said second side of said expandable bag have a plurality of apertures formed therein through which said flowable material exudes when said bag is being inflated to form a seal between said expandable bag and said first vertical brace member and said second vertical brace member.

* * * * *